United States Patent
Yaman et al.

(10) Patent No.: US 12,034,482 B2
(45) Date of Patent: Jul. 9, 2024

(54) ACCURATE MEASUREMENT FOR GUIDED ACOUSTIC-WAVE BRILLOUIN SCATTERING

(71) Applicant: NEC Laboratories America, Inc., Princeton, NJ (US)

(72) Inventors: Fatih Yaman, Princeton, NJ (US); Eduardo Mateo Rodriguez, Tokyo (JP); Shinsuke Fujisawa, Princeton, NJ (US); Hussam Batshon, Monroe, NJ (US); Kohei Nakamura, Tokyo (JP); Takanori Inoue, Tokyo (JP); Yoshihisa Inada, Tokyo (JP); Takaaki Ogata, Tokyo (JP)

(73) Assignee: NEC Corporation, Tokyo (JP)

( * ) Notice: Subject to any disclaimer, the term of this patent is extended or adjusted under 35 U.S.C. 154(b) by 422 days.

(21) Appl. No.: 17/336,280

(22) Filed: Jun. 1, 2021

(65) Prior Publication Data
US 2022/0278748 A1    Sep. 1, 2022

Related U.S. Application Data

(60) Provisional application No. 63/141,068, filed on Jan. 25, 2021, provisional application No. 62/704,927, filed on Jun. 3, 2020.

(51) Int. Cl.
| | |
|---|---|
| H04B 10/2537 | (2013.01) |
| G01H 9/00 | (2006.01) |
| H01S 3/067 | (2006.01) |
| H01S 3/10 | (2006.01) |
| H01S 3/16 | (2006.01) |
| H01S 3/30 | (2006.01) |
| H04B 10/073 | (2013.01) |
| H04B 10/61 | (2013.01) |

(52) U.S. Cl.
CPC ...... *H04B 10/2537* (2013.01); *G01H 9/004* (2013.01); *H01S 3/06716* (2013.01); *H01S 3/10061* (2013.01); *H01S 3/1608* (2013.01); *H01S 3/302* (2013.01); *H04B 10/073* (2013.01); *H04B 10/615* (2013.01)

(58) Field of Classification Search
CPC .. G01H 9/004; H04B 10/2537; H04B 10/615; H04B 10/072; H04B 10/073; H01S 3/0676; H01S 3/10061; H01S 1608/302; H01S 3/06716; H01S 3/1608; H01S 3/302

See application file for complete search history.

(56) References Cited

U.S. PATENT DOCUMENTS

2015/0377656 A1 * 12/2015 Bastianini .......... G01D 5/35364
356/300

FOREIGN PATENT DOCUMENTS

JP    2019161246 A  *  9/2019

OTHER PUBLICATIONS

Voigt, K., et al. "Fully passive Si-photonic 90 hybrid for coherent receiver applications." 2011 37th European Conference and Exhibition on Optical Communication. IEEE, 2011. (Year: 2011).*

* cited by examiner

*Primary Examiner* — Dominic J Bologna
(74) *Attorney, Agent, or Firm* — Joseph Kolodka

(57) ABSTRACT

Aspects of the present disclosure are directed to systems, methods, and structures providing for the accurate measurement of guided acoustic-wave Brillouin scattering in optical fiber transmission systems and facilities.

8 Claims, 10 Drawing Sheets

ACCURATE MEASUREMENT FOR GUIDED ACOUSTIC-WAVE BRILLOUIN SCATTERING

CROSS REFERENCE

This disclosure claims the benefit of U.S. Provisional Patent Application Ser. No. 63/704,927 filed Jun. 3, 2020 and U.S. Provisional Patent Application Ser. No. 63/141,068 filed Jan. 25, 2021 the entire contents of each of which is incorporated by reference as if set forth at length herein.

TECHNICAL FIELD

This disclosure relates generally to optical communications systems. More particularly, it pertains to the accurate measurement of noise generated by acoustic-wave Brillouin scattering (GAWBS) in optical fiber when used in long-distance optical communications.

BACKGROUND

As is known, optical communications systems employing optical fiber have become the backbone of modern communications and an enabling technology for innumerable contemporary services. Of particular importance to contemporary optical communications systems, are optical fiber facilities and supporting components located undersea (i.e., submarine).

As will be understood and appreciated by those skilled in the art, submarine optical systems and facilities serve as a backbone of global, intercontinental telecommunications traffic. As will be further appreciated, submarine optical systems exhibit several characteristics namely: 1) They are very long—as they connect multiple contents to one another; and 2) They are still quite expensive to place and maintain, replace, upgrade and/or repair. Given their importance and noted characteristics, any performance degradation of existing submarine systems and facilities is of great concern.

One such source of degradation of submarine systems and facilities is guided acoustic-wave Brillouin scattering (GAWBS). And while GAWBS is difficult to measure in a laboratory setting, in the field where there are many tens of thousands of kilometers of deployed optical fiber facilities, GAWBS accumulates resulting in noticeable degradation of optical signal quality.

Accordingly, systems, methods, and structures that permit the accurate measurement of GAWBS—particularly in a laboratory environment over short lengths of optical fiber—would represent a welcome addition to the art and permit further understanding of this critical source of optical communications degradation.

SUMMARY

An advance in the art is made according to aspects of the present disclosure directed to systems, methods, and structures providing for the accurate measurement of guided acoustic-wave Brillouin scattering in optical fiber transmission systems and facilities.

In sharp contrast to the prior art, systems, methods, and structures according to aspects of the present disclosure employ a homodyne receiver which advantageously simplifies measurement processing and avoids any dynamic range limitations by suppressing a large carrier. Importantly, systems, methods, and structures according to aspects of the present disclosure determine an accurate estimation of noise level(s) as compared to the carrier by utilizing a secondary laser. In this inventive manner, systems, methods and structures according to aspects of the present disclosure determine an accurate measurement of GAWBS noise even over short lengths of optical fiber while—at the same time—simultaneously providing a measurement of both polarization components of GAWBS noise.

Accordingly, as we shall show and describe systems, methods and structures according to aspects of the present disclosure advantageously suppress the large carrier by using band-pass filters, which dramatically improve the dynamic range of the measurement. Additionally, systems, methods, and structures according to aspects of the present disclosure employ a secondary laser that advantageously allows for an accurate calibration of noise level as compared to the carrier—without sacrificing dynamic range. Finally, systems, methods, and structures according to aspects of the present disclosure provide the simultaneous measurement of both polarization components of GAWBS which is a most important check of such measurements.

BRIEF DESCRIPTION OF THE DRAWING

A more complete understanding of the present disclosure may be realized by reference to the accompanying drawing in which:

FIG. 5(A) spectrum of laser phase noise measured in back-to-back configurations and the estimated noise spectrum; and FIG. 5(B) close up of a region from 20 to 100 MHz of FIG. 5(A) according to aspects of the present disclosure;

FIG. 6(A) spectrum after a Fiber Under Test (FUT) compared to the laser phase noise estimated in the back-to-back configuration; and FIG. 6(B) spectrum after FUT compared after removing laser phase noise according to aspects of the present disclosure;

Figure 1:
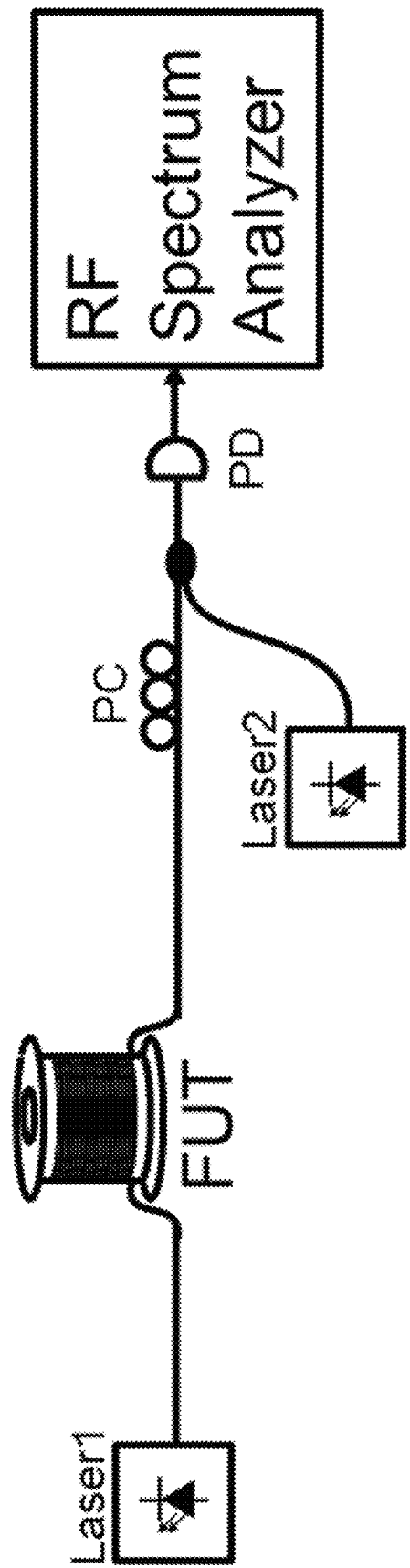
FIG. 1 shows a schematic diagram of a simplified illustrative example heterodyne measurement method using an RF spectrum analyzer according to the prior art.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that with respect to GAWBS degradation, GAWBS measurements are very small quantities, and therefore difficult to measure accurately in a lab setting using a relatively short length of optical fiber. As those skilled in the art will understand and appreciate, GAWBS is generally caused by acoustic waves bouncing back and forth between circular sides of an optical fiber. These acoustic waves—themselves caused by random thermal fluctuations—modulate the refractive index of the fiber. Consequently, the phase and the polarization of a light signal guided along the fiber is modulated by the refractive index modulation—which effectively generates noise in the signal.

Those skilled in the art will recognize that the noise generated by GAWBS appears as discrete side tones centered around the signal carrier, and for a 1 km, fiber the side tones are only about 70 dB below (one tenth of a millionth) of the signal carrier. However, their power grows linearly with optical fiber distance and for instance after 10000 km, they can reduce a Q value—which is a measure of the received signal quality—by about 0.3 to 1 dB depending on other system parameters.

Since GAWBS is such a small quantity when measured using short samples of fiber, it becomes a challenge to design a measurement technique that is simple to set up and accurate enough for a laboratory configuration where relatively short fiber lengths are necessary. Fortunately—and as we shall show and describe—systems, methods, and structures according to aspects of the present disclosure overcome this infirmity associated with prior art measurements. Advantageously, systems, methods, and structures according to aspects of the present disclosure enable the measurement of GAWBS for short lengths of optical fiber—as short as only a few kilometers—lengths that are easily achievable in a lab environment. In addition to eliminating the need for long lengths of fiber, systems, methods, and structures according to aspects of the present disclosure enable the measurement of GAWBS noise in a cost effective, fast, relatively simple and accurate operation and configuration.

To appreciate the significance of our inventive systems, methods, and structures according to aspects of the present disclosure, it is useful to review an illustrative undersea optical communications system. As will be understood and appreciated, data to be transmitted over the undersea cable is applied to the cable at a cable located at a point—usually an endpoint—of the optical undersea cable. The data is then delivered to another cable station via an undersea/submarine cable similarly located at an opposite endpoint of the optical cable.

Those skilled in the art will understand and appreciate that typical submarine cables have two parts namely, a cable span and repeaters located at appropriate points along the length of the cable. The cable span can be 40 km to 150 km or longer, but typically in the 50-80 km range.

While cable spans may include several elements, the main component of a span is the optical fiber(s). As is known in the art, optical telecommunciations fibers are very thin strands of glass that can guide light with low attenuation. Optical fibers are very thin—about 250 microns diameters typically. Generally, optical fibers are made of pure silica glass and exhibit a cylindrical shape.

Light is guided through a doped center "core" which is surrounded by a cladding. Typically, a core diameter is approximately 5-12 micrometers, and the cladding diameter is approximately 125 micrometers. The glass fiber is further coated by one or more polymers to protect it which results in an overall diameter of approximately 250 micrometers.

Generally—and in particular undersea optical fiber cable—such cables include a plurality of fibers each fiber configured to convey additional data/traffic. When so configured, the data carrying capacity of an optical fiber cable such as an undersea cable is proportional to the number of individual optical fibers comprising the cable.

Since optical fibers comprising an optical cable are very thin, in principle, the capacity of the cable can be increased dramatically by adding more fibers. However, this is not generally the case because of power limitations. While contemporary optical fibers exhibit a low attenuation, the optical power can nevertheless drop to 1% after only 1 span. Accordingly, after a span, signal light conveyed in an optical fiber (undersea cable) is amplified by amplifiers located in repeaters that as we have already noted are located at various points along a length of an undersea cable. In a typical configuration of an undersea cable, there may be one amplifier dedicated to each fiber within a cable. As such, one of the limitations as to the number of fibers that can be supported by a cable system is the number of amplifiers that can be physically located in a repeater as well as the amount of electrical power available at the repeater.

There are two approaches to measuring GAWBS. First approach relies on emulating an exceptionally long transmission distance, and therefore accumulating the GAWBS noise to an easily measurable level. In this approach a recirculating loop is configured which includes several fiber spans under test having repeaters positioned between spans. A total optical fiber distance in the recirculating loop may be several hundred kilometers.

To emulate a transmission path having a much longer distance, the signal received at one end of the loop is redirected back to the input of the loop and recirculating the signal in the same loop many times until the signal it recovered after traversing a desired distance.

As those skilled in the art will understand and appreciate, there are several drawbacks to such an approach. First, it is overly complicated. Setting up such a loop requires careful adjustment of amplifiers, applying amplifier gain to the span loss, managing the accumulation of the imperfections of the amplifier gain shape etc. Second, the recirculating loop approach typically still requires multiple spans and to establish a long loop using only a single or even a couple spans may make the loop unsuitable for emulating long distances. Finally, transmitting over long distances accumulates not only GAWBS noise, but also accumulates other impairments from the fiber.

For instance, amplified-spontaneous emission (ASE) noise added by amplifiers after each span, and nonlinear noise generated by nonlinear interaction of signals along the link. Both ASE and nonlinear noise increase linearly with transmission length, and therefore in the art will recognize that while the noise generated by GAWBS increases with longer distance, its ratio to other noise sources remain the same after first span. Therefore, after long distance emulator, the noise sources need to be carefully analyzed and separated to isolate GAWBS.

A second approach to measuring GAWBS noise employs shorter lengths of optical fibers over a single, or a few spans. This approach requires sensitive equipment to measure the very low accumulated GAWBS over short spans. One example of such measurement uses a radio frequency (RF) and the overall arrangement is shown schematically in FIG. 1.

With reference to that figure, we note that during operation a narrow linewidth laser is first launched into a fiber under test (FUT). Output is directed to a photodiode after combining with a second narrow linewidth laser. After there FUT the illustrative configuration may include amplifiers and/or filters to condition the signal.

One critical requirement is that the polarization of both lasers should be aligned at the photo-diode (PD) as it detects the beating between the two lasers. Typically some sort of polarization controller (PC) is used to for this alignment.

Appreciably, a configuration such as that shown in the figure makes measurements much simpler as compared to the previously noted approach(es) as it requires only a single span of fiber. However, there are still several disadvantages. First, a polarization state of laser 1 needs to be actively controlled, either manually, which makes it unwieldy, or automatically using some sort of instrumentation, which makes it more expensive, and complicated. Second, GAWBS noise is generated in all polarizations, and this configuration shown in the figure measures GAWBS noise only in a polarization that is aligned with the polarization of the local oscillator (in FIG. 1 this duty is assigned to laser 2). Accordingly, to measure GAWBS in both polarization(s) the PC needs to be adjusted carefully to measure total GAWBS in two separate measurements. Third, even narrow linewidth lasers have laser phase noise that is large enough to affect the measurement of the GAWBS. Using two separate lasers means doubling such noise level, which will reduces the sensitivity of the measurement. Finally, employing two separate lasers means that their frequencies are not locked. That means, frequency and phase drift between the two lasers need to be digitally estimated and removed, which adds one more possible route for affecting the measurement sensitivity.

In our systems, methods, and structures according to aspects of the present disclosure, output light of a continuous-wave (CW) laser is split into two separate beams. One beam acts as the local oscillator, and the other beam is combined with a second laser that we call a calibrating laser, Laser-cal, and launched into the FUT. After the FUT, amplifiers may be used to increase signal power and optical band-pass filters may be employed to limit ASE noise.

Figure 2:
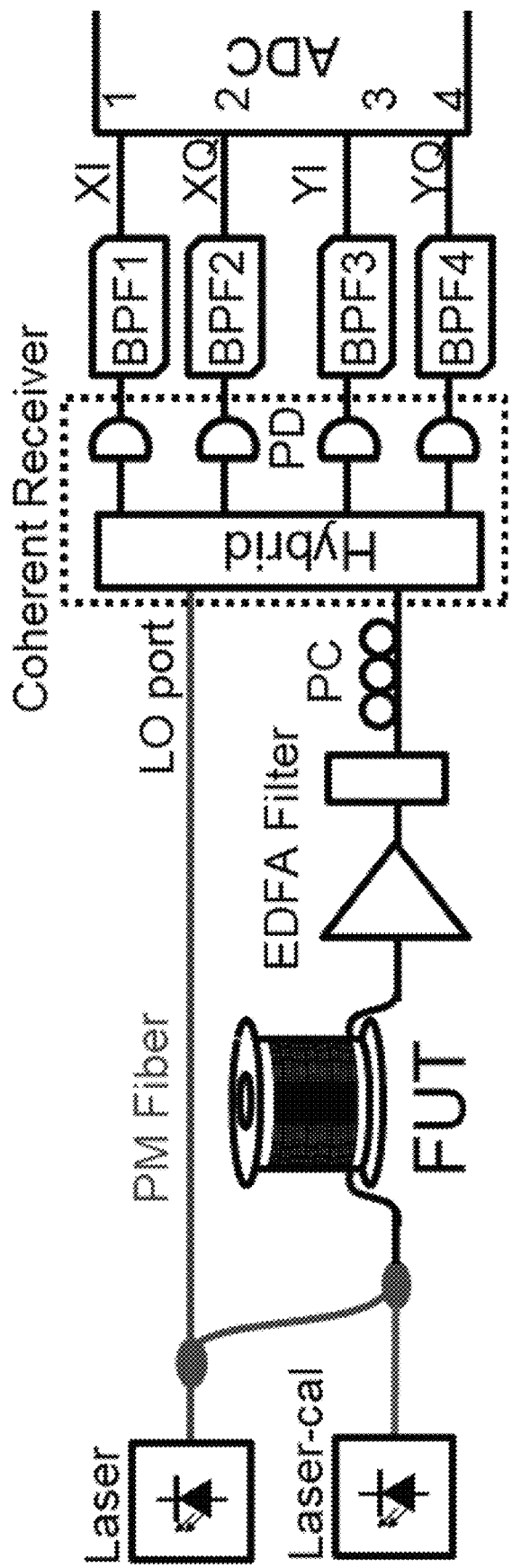
FIG. 2 shows a schematic diagram of an illustrative measurement arrangement according to aspects of the present disclosure.

FIG. 2 shows a schematic diagram of an illustrative measurement arrangement according to aspects of the present disclosure. With reference to that figure, we note that even though a PC is included in the signal path—it is not necessary. After a filter signal enters it is directed to a signal port of a coherent receiver. Those skilled in the art will know that a contemporary coherent receiver is a ubiquitous device in optical communication and a hybrid in the coherent receiver takes as input the local oscillator (LO) and the signal. It creates 4 separate paths each of which overlaps the signal and the LO in two orthogonal polarization usually denoted as X and Y, and for each polarizations overlaps them in two quadratures known as in-phase and in 90-degrees out of phase usually denoted as I and Q. The beating in the 4 quadratures are detected by 4 balanced photo-diodes. The beating signals are passed through RF band-pass filters and. after filtering, the 4 beating signals are sampled by an ADC. Note that all the phase, amplitude and polarization information regarding the signal with respect to the LO is contained in these 4 beating signals.

As those skilled in the art will understand and appreciate—since systems, methods, and structures according to aspects of the present disclosure employ a coherent receiver—all the information in all the polarizations is always maintained. Therefore, our systems, methods, and structures can advantageously measure GAWBS noise in both polarizations most conveniently and it is not necessary to manage a polarization state of the Laser as any drift of the signal polarization can be traced and removed using signal processing. Note that polarization drifts much slower than phase which is much more accurate as compared to phase tracking required for the heterodyne method shown in FIG. 1.

We note that BPFs located after the coherent receiver improve the sensitivity of our measurement configuration. They advantageously allow the shifting of the dynamic range of the measurement to that range exhibiting GAWBS noise, and it also removes noise from ASE-ASE beating. Note that GAWBS noise extends to about 1 GHz away from the CW laser, which is oftentimes referred to as the carrier. The optical BPF's located after the erbium-doped fiber amplifiers (EDFAs) filter out ASE noise, however, in practice it is difficult to find ASE filters having band-pass bandwidths as narrow as 2 GHz. Typically they tend to be as wide as 50 GHz.

One alternative arrangement involves digitally filtering out of band noise if the ADC has a sufficiently large bandwidth. However, sampling the noise at such a high bandwidth introduces an unnecessary noise floor. Our configuration advantageously solves this problem by using an RF filter that filters signals above 1 GHz after the photo-diodes, but before sampling. In this manner the out-of-band ASE is prevented to fold back into the 1 GHz after sampling, and also eliminates excess noise from ASE-ASE beating noise from the higher frequency noise.

As may be appreciated, one advantage of using BPFs is that it allows for using practical and low cost optical BPFs, while also allowing the use of a low sampling rate ADC, at the same time preventing deterioration from out-of-band ASE noise. Note that for some special fibers, GAWBS noise can extend further or less than 1 GHz. The BPFs higher rejection edge can be reduced or increased as required according to the FUT.

Note further that there is another advantage of using BPFs namely, for rejecting power close to the DC. As an example, consider rejecting noise from DC to 15-20 MHz. GAWBS noise exhibits itself as multiples peaks of noise. The peak with the lowest frequency for typical fibers with cladding diameters around 125 micrometers is greater than 20 MHz. For optical fibers with significantly different parameters a more suitable threshold can be chosen.

One reason for rejecting the DC can be explained as follows. As noted earlier, the ratio of the GAWBS noise peaks to the carrier level is typically larger than 60 dB. This means the measurement noise floor should be close to 80 dB below the carrier level to exhibit a sufficient precision—which is difficult to achieve. As such, this is—in effect—a limitation of the dynamic range. As a solution, the DC portion can be rejected which contains the carrier power.

Figure 3:
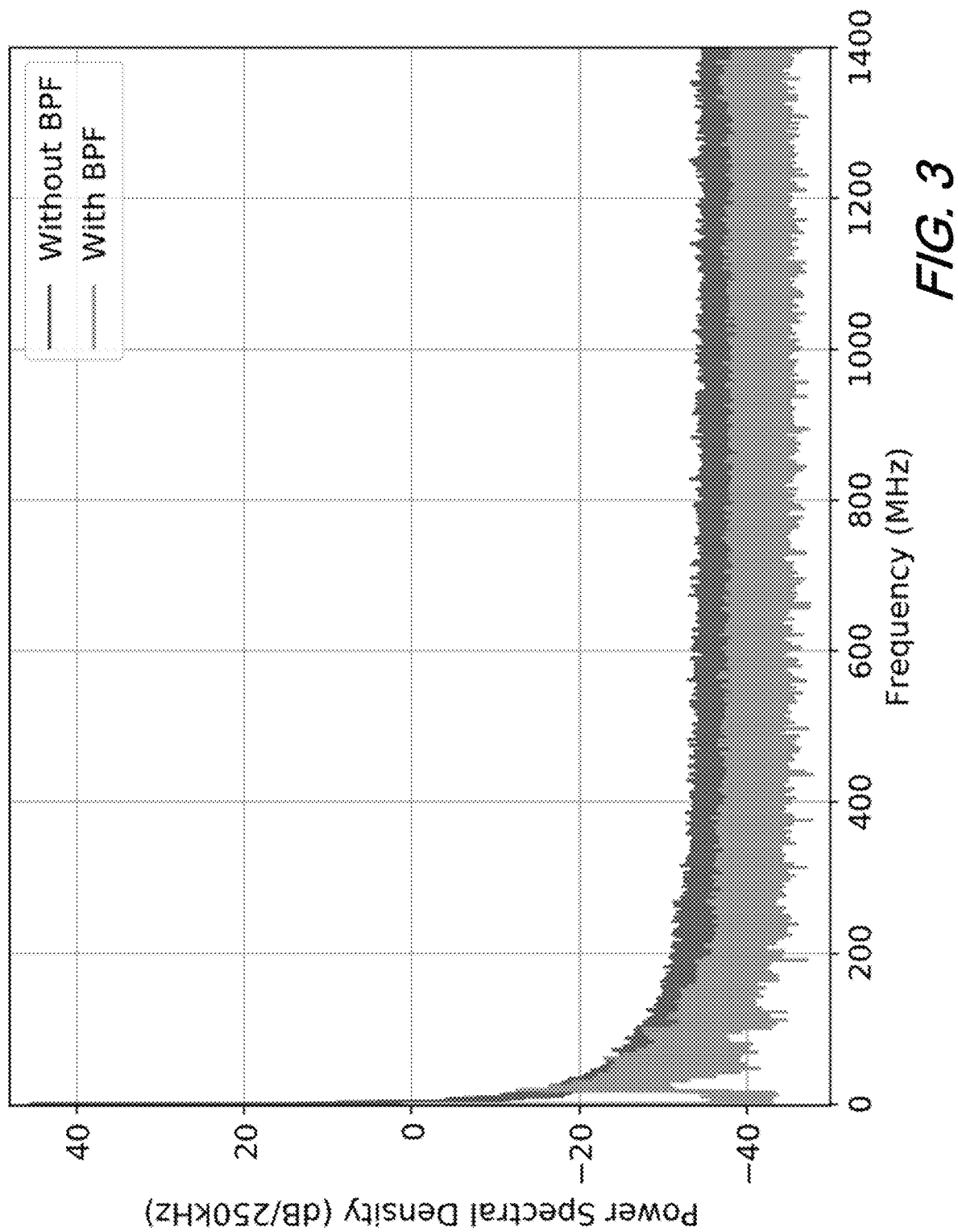
FIG. 3 shows a plot of Power Spectral Density vs. Frequency showing a comparison of back-to-back measurements illustrating the impact of a Band Pass Filter (BPF) according to aspects of the present disclosure.

FIG. 3 shows an example of a measurement, where the FUT is removed and the carrier and the noise floor in the back-to-back configuration. Without the BPF, there is a large DC contribution which comes from the DC with higher noise floor. Suppressing the DC with a BPF shows that the noise floor is reduced but the DC carrier can no longer be measured within the same measurement.

Notwithstanding, removing the carrier leaves us with another problem. The GAWBS noise power is only meaningful relative to the carrier. With the carrier removed from the measurement, how can we relate the measured GAWBS noise level to the carrier level? Even though one can calibrate this in separate measurements, it is better to have a self-calibrating scheme, where instabilities or drifts between separate measurements which can inject further uncertainties into the measurements can be avoided.

Figure 4:
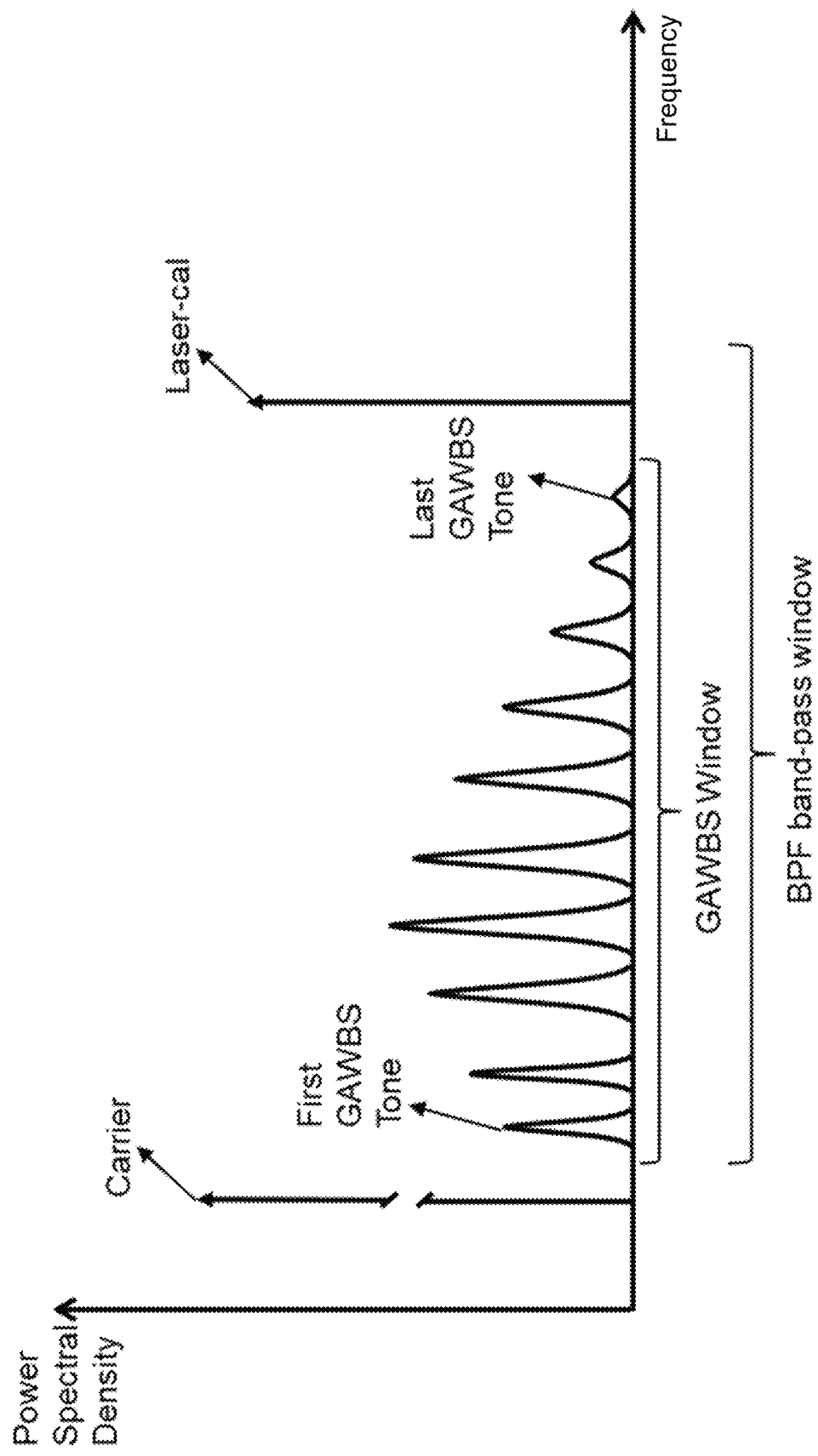
FIG. 4 shows a plot of Power Spectral Density vs. Frequency illustrating measurement settings according to aspects of the present disclosure.

To achieve this further improvement, we employ a calibrating laser—Laser-cal. Laser-cal is another narrow-band laser which is combined with the original laser before entering the FUT. The power level of the Laser-cal is adjusted to be about 30 dB below the Laser. Its polarization in general can be totally arbitrary as compared to the Laser however, to simplify the digital processing, it can advantageously be aligned to the Laser. This can simply be obtained by using PM components for combining the two lasers. Frequency of Laser-cal is shifted with respect to the laser in such a way that it is outside of the bandwidth where the GAWBS tones are measured, but just inside the passband of the BPFs. FIG. 4 shows how the signal will appear in a spectral domain.

We define the GAWBS window as shown in FIG. 4 as the window that contains all the GAWBS tones desired to be measured. For transmission systems what matters is the total GAWBS noise power experienced by the signal.

The GAWBS tones typically have a maximum around 100-300 MHz, and beyond that the power of the tones decreases away from the carrier. We define the last GAWBS tone as the tone after which the contribution of additional tones is negligible. Therefore, the first and the last GAWBS tones determine the GAWBS window.

The frequency of the Laser-cal is chosen so that it is beyond the last GAWBS tone, but still inside the band-pass window of the BPFs. Since the power of the Laser-cal is 30 dB lower than the carrier, the Laser-cal and GAWBS can be simultaneously measured without requiring such a large dynamic range as before.

The power level of the GAWBS tones can be compared to the Laser-cal which can be used to as a calibration point to relate the GAWBS power to the carrier power. Note that, similar t the case of heterodyne approach, Laser-cal is not locked to the carrier. That means its frequency and phase will drift compared to the carrier within the measurement time window. However, in our case all we need is the total power of the Laser-cal, and we are not interested in its instantaneous frequency. Therefore, we can keep the measurement window almost arbitrarily long to improve sensitivity as needed, so long as any frequency drift is not too large that it would overlap with the GAWBS window. Such is the case for most commonly used lasers for communications.

To reiterate—with this configuration according to aspects of the present disclosure, the measurement is no longer limited by the dynamic range of the measuring equipment, while we can directly calibrate the GAWBS power to the carrier. We can measure both polarizations of the GAWBS noise simultaneously. We also can limit the impact of the ASE noise by narrow-band filtering achieved by coherent detection and the RF BPFs.

We note however, that there is one more aspect associated with our solution and the heterodyne approach as compared to the first approach that merely emulated long-distance transmission. Typical narrow-band lasers used for optical communications have low linewidth and phase noise, however, it is still large enough that the residual laser phase noise extends into the GAWBS window and buries tones, especially those close in frequency to the carrier. This can be seen in FIG. 3, where the laser phase noise extends to ~300 MHz. In the case of the first approach of the prior art, GAWBS accumulates long enough to dominate the residual laser phase noise. Despite this minor inconvenience, we note once again that prior art methods must account for other noise sources such as ASE and nonlinearity that also grows with distance which systems, methods, and structures according to aspects of the present disclosure advantageously overcome.

We note that according to aspects of the present disclosure it is nevertheless, not that difficult to correct any residual laser linewidth as it can be accurately measured and removed from the measured signal. Lase noise can be measured in back-to-back condition by removing the FUT. The lase phase noise would remain unchanged after the FUT however, in the case of nonlinear noise accumulated after a long transmission distance, or an emulator of a long transmission distance, the nonlinear noise depends on many parameters of the measurement set up such as fiber dispersion, loss, neighboring signals if there are any, etc.

Figure 5A:
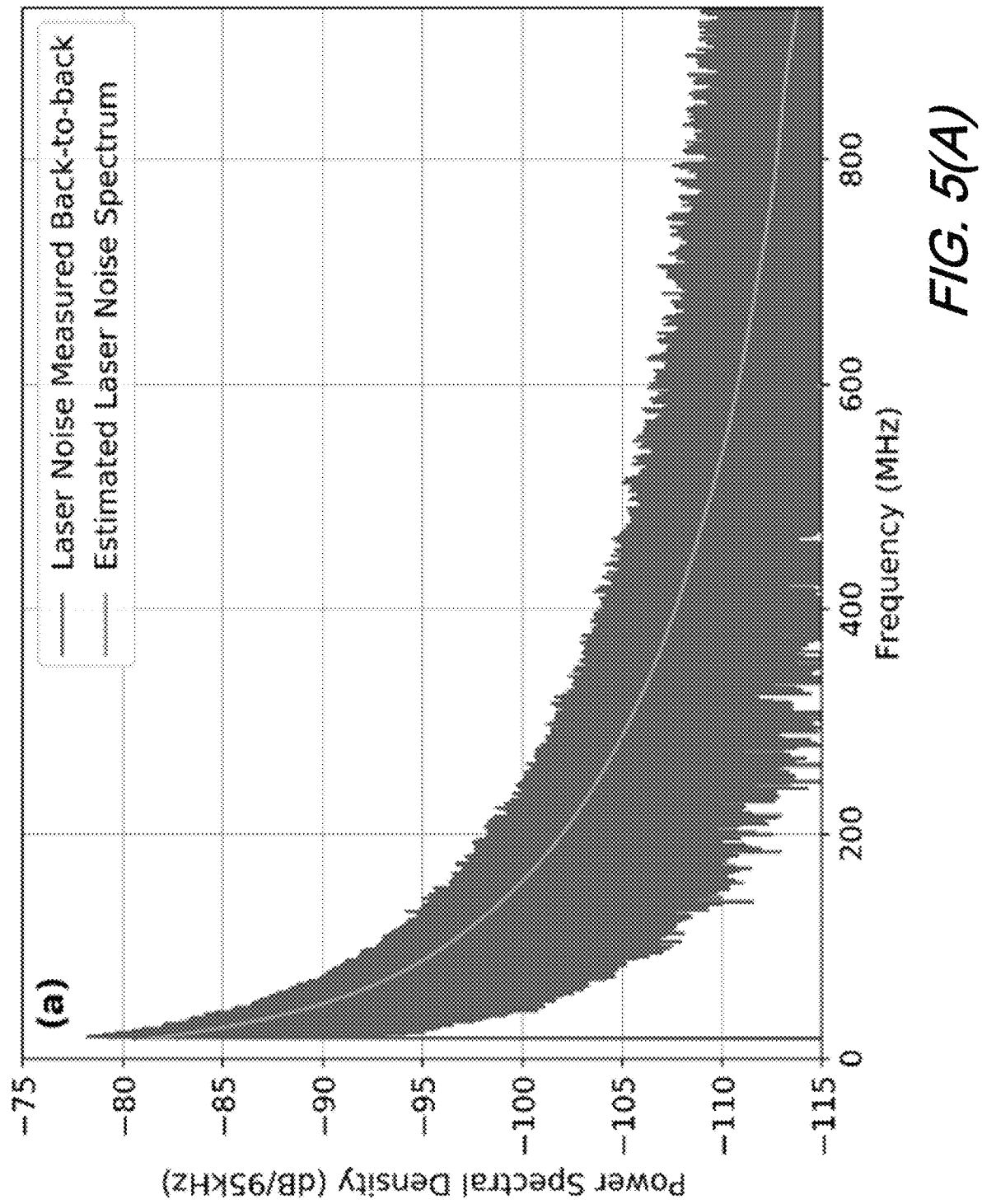
FIG. 5(A) FIG. 5(B) are plots of Power Spectral Density vs. Frequency showing.
Figure 5B:
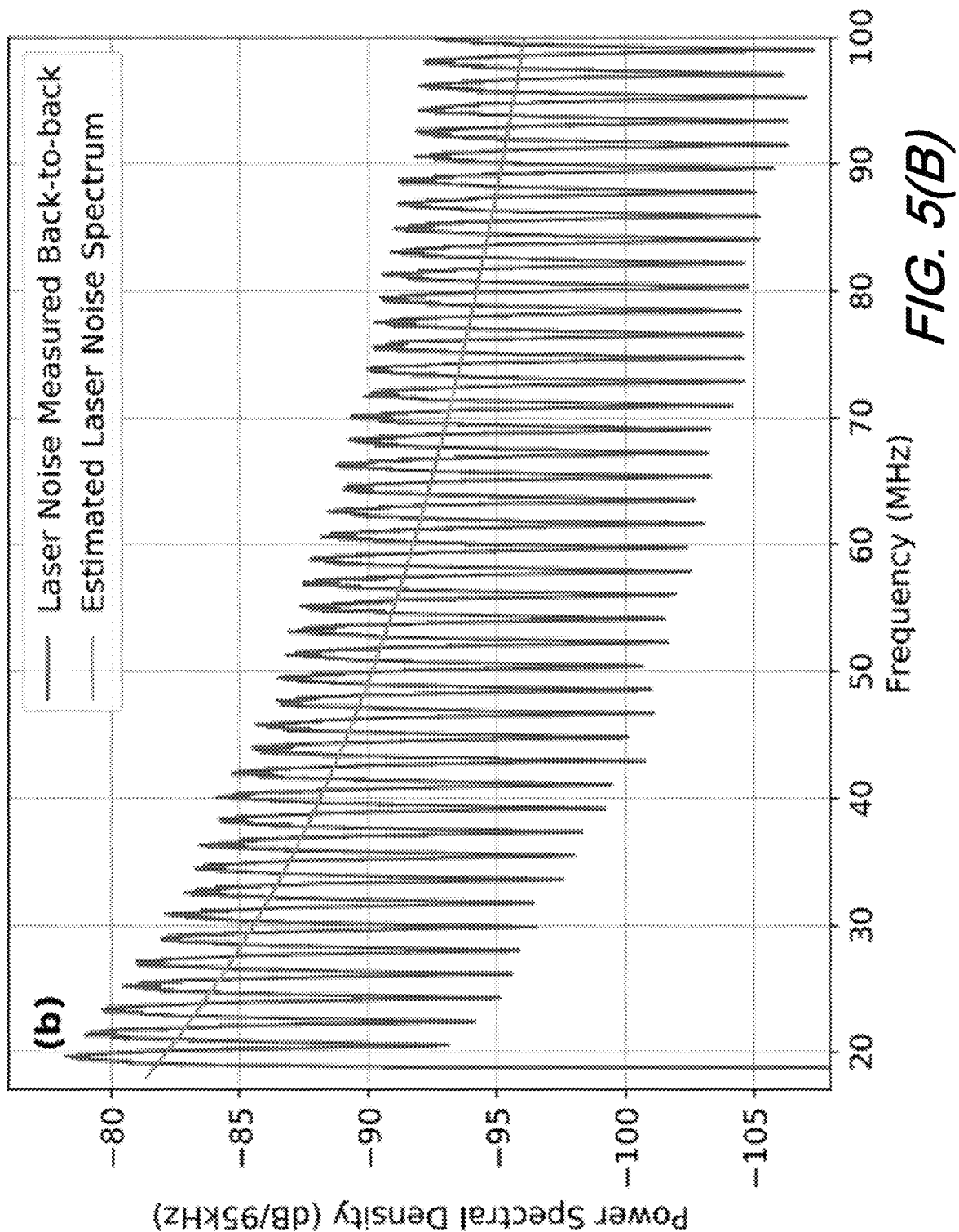

FIG. 5 shows a laser spectrum in a back-to-back configuration, i.e., the FUT is removed. Since this is a homodyne measurement, meaning the signal and the LO originate from the same source, any delay between the signal and LO arm exhibits as a sinusoidal filtering of the residual laser noise. This filtering can be clearly seen in the zoomed in version of the figure in FIG. 5(B). From this measurement we estimate the laser phase noise spectrum as shown in FIG. 5. After inserting the FUT, we can subtract the laser phase noise to isolate the GAWBS noise.

After the FUT, the signal is received by the ADC. After sampling the signal, a power spectral density (PSD) can be calculated. If the received power is comparable to the equipment noise floor, the noise floor can also be measured and removed from the PSD. In addition, measurement set up has a frequency dependent response, that response can also be measured and removed as well.

Figure 6A:
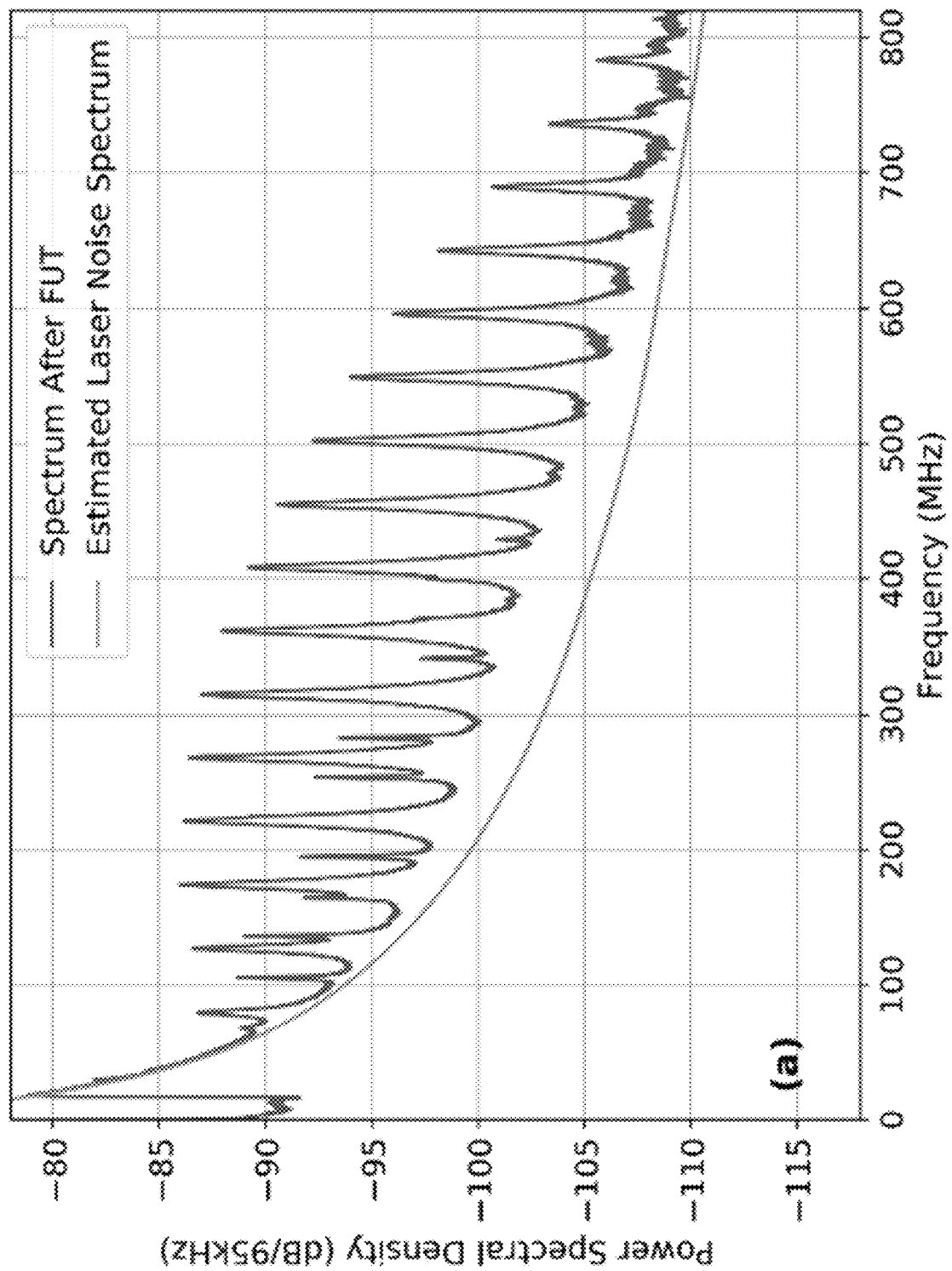
FIG. 6(A) FIG. 6(B) are plots of Power Spectral Density vs. Frequency showing.

FIG. 6(A) shows the PSD after the PSD obtained after 48-km-long single mode fiber. In this example, the ADC noise floor was measured without signal, and subtracted from the signal PSD. Furthermore, this example shown in the figure is for the signal with the polarization that is aligned with that of the carrier. Since GAWBS creates a symmetric spectrum around DC, only the positive spectrum is shown. It can be clearly seen that laser phase noise has a large contribution to the PSD especially for lower frequencies. For accurate estimation of GAWBS noise, this contribution should be accurately estimated and removed.

Figure 6B:
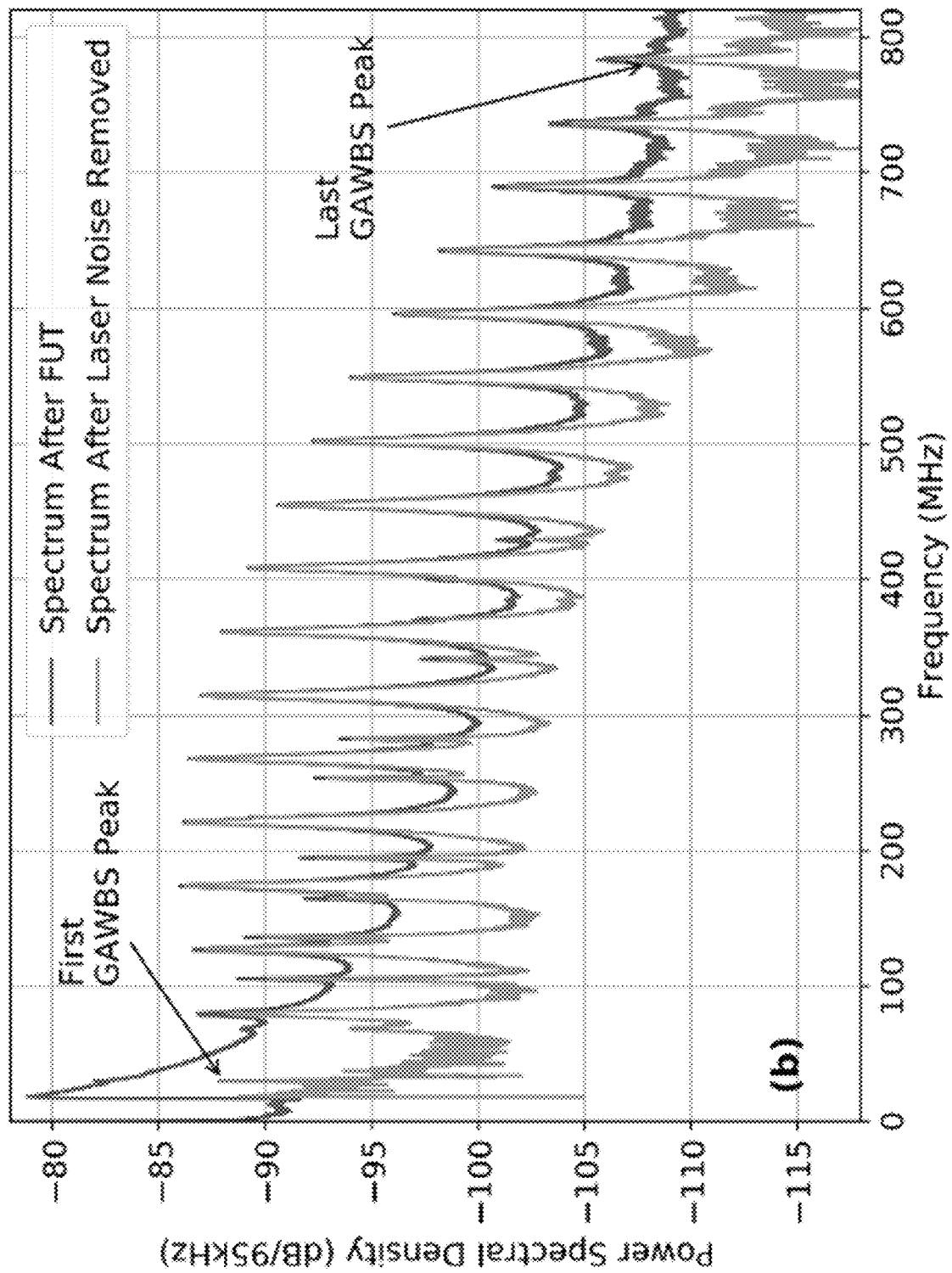

FIG. 6(B) shows PSD after the laser phase noise is removed. As an example, in this figure the criterion for choosing the GAWBS window is such that it includes all the GAWBS peaks that are higher than 20 dB below the highest GAWBS peak.

Figure 7:
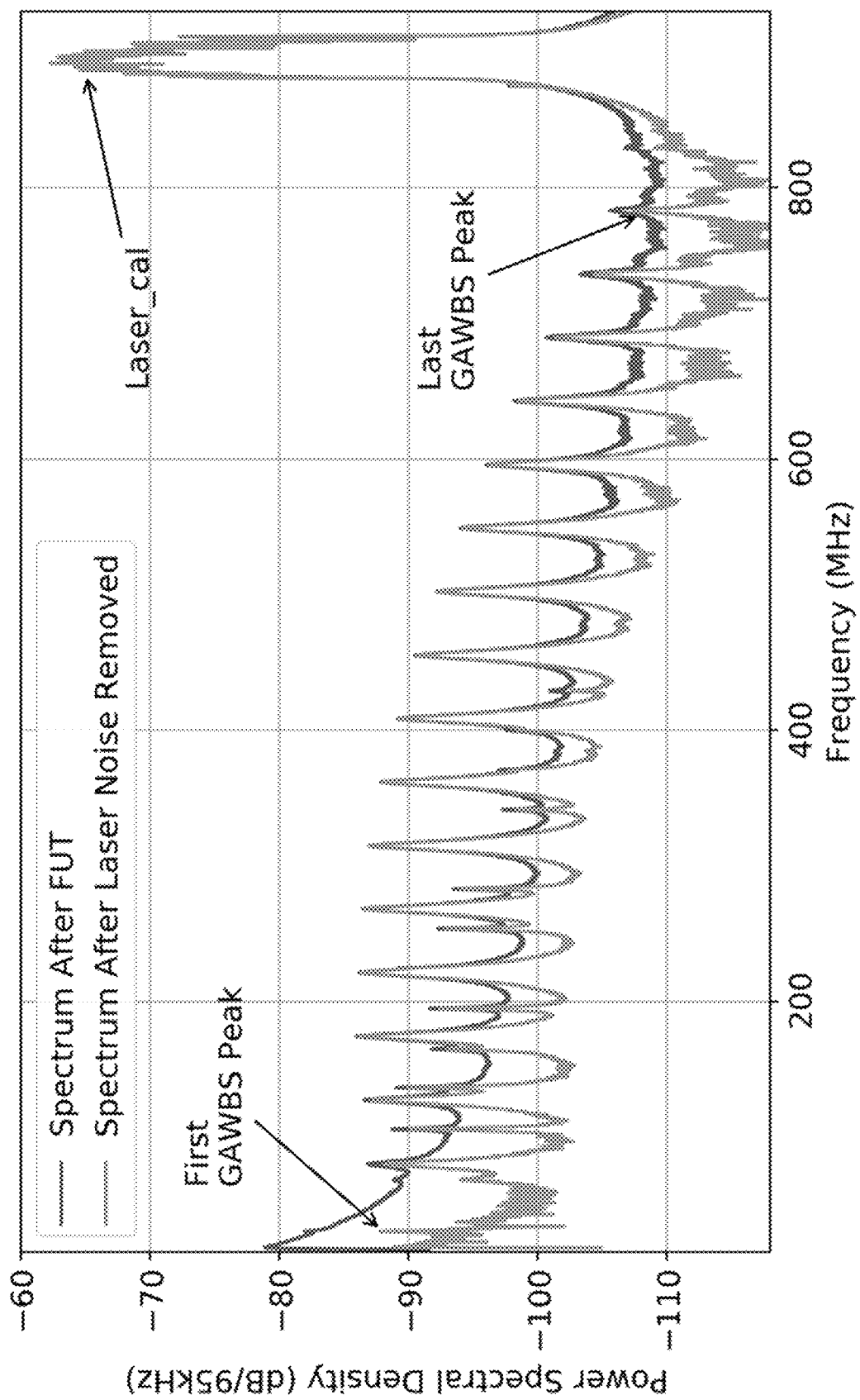
FIG. 7 is a plot of Power Spectral Density vs. Frequency that is the same is FIG. 6(B) however x-axis is extended to show the Laser-cal at the edge of the GAWBS window used for calibrating the level of GAWBS to the level of the carrier according to aspects of the present disclosure.

FIG. 7 shows the measurement result after FUT, which is the same as that shown in FIG. 6(B), however, in FIG. 7 the Laser-cal is also shown. In this example, the power level of the Laser-cal was 29 dB lower than power level of the carrier. It is located nominally 900 MHz away from the carrier, which is just outside of the GAWBS bandwidth and inside the passband of the BPF.

Note that the Laser-cal is a narrow linewidth laser similar to the carrier, however it appears broadened as it is not frequency/phase locked to the carrier. Within the measurement time, Laser-cal's phase and frequency drift with respect to the carrier. However, since we are only interested in its power, we just integrate the total power under the Laser-cal. Therefore, we do not need any signal processing to remove frequency variations of either the carrier or the Laser-cal. Note that in FIG. 7, only the polarization components parallel to the carrier is shown. In general the Laser-cal may not be parallel to the carrier. In that case, one needs to add all the power of the Laser-cal in both polarization components.

Figure 8:
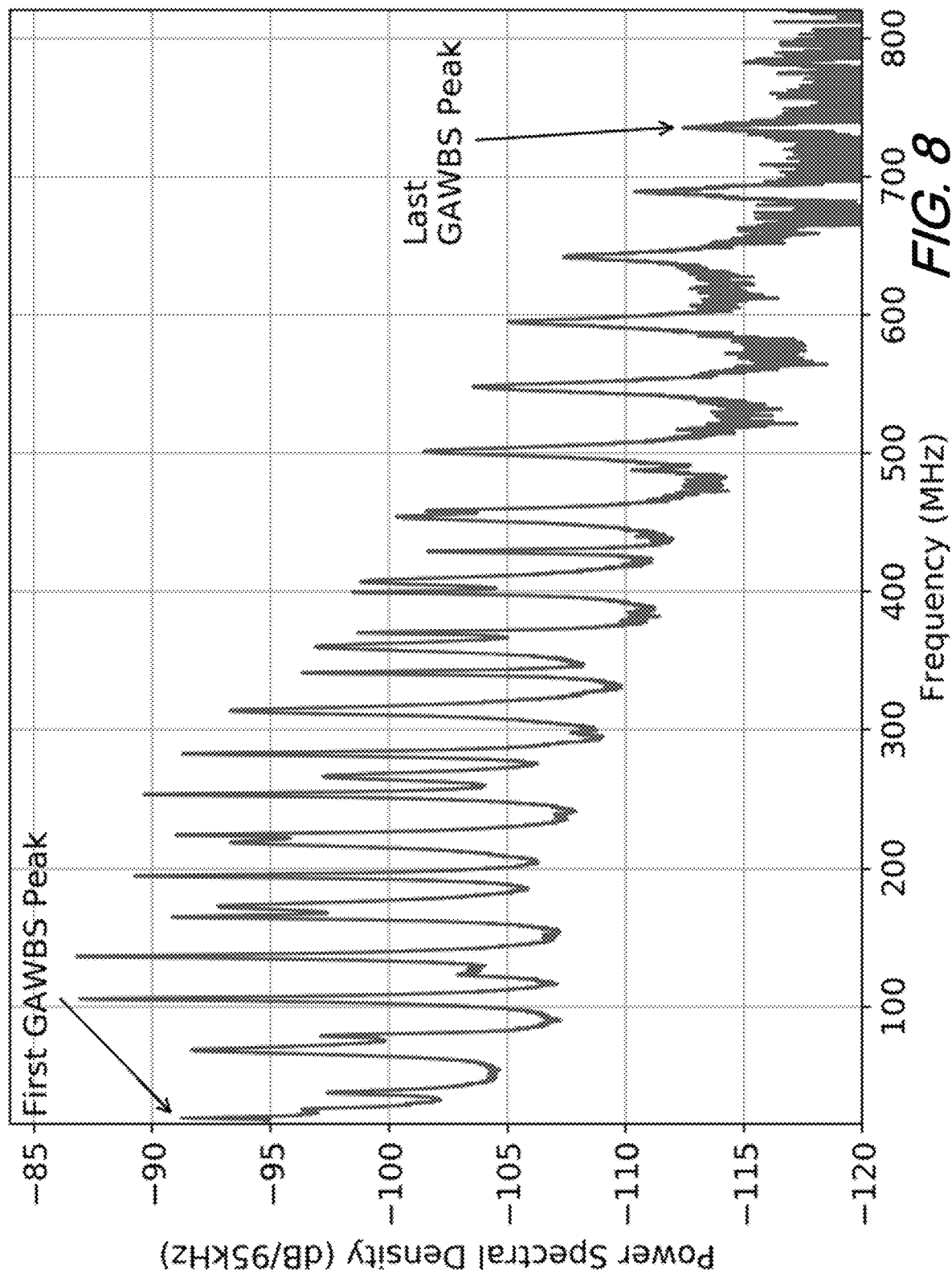
FIG. 8 is a plot of Power Spectral Density vs. Frequency showing GAWBS noise measured in the polarization orthogonal to that of the carrier span length is longer, the noise floor from Amplified Spontaneous Emission (ASE) which is expected to be flat is estimated and removed according to aspects of the present disclosure.

Typically, laser phase noise is polarized parallel to the carrier. Therefore, no residual phase noise is expected to distort the measurement of the GAWBS noise polarized orthogonal to the carrier. PSD in the orthogonal polarization to the carrier is shown FIG. 8 after the ADC noise floor is removed. As it can be seen from that figure, orthogonal polarization is not affected by the laser phase noise. However, in case there is orthogonally polarized noise, or the carrier polarization is not accurately retrieved, the leakage from the parallel polarized phase noise to the orthogonal polarization can still be estimated and removed similarly. In this example, the GAWBS windows is chosen to include all the GAWBS peaks within 25 dB of the largest GAWBS peak.

It should be noted that by once again inspecting FIG. 2, which shows the measurement configuration in which our measurement also includes contribution from ASE. However, if the span length is not too long <80 km, the contribution of ASE would be below the instrument noise floor, and it can be neglected.

We note that the illustrative examples shown in the figures are measurements from 48-km-long fibers, however it is clear from the high signal-to-noise ratio shown in the figures that when considering systems, methods and structures according to aspects of the present disclosure, GAWBS can advantageously be measured reliably for fibers as short as just a few kilometers. Being able to measure GAWBS for such short sections of fiber allows for estimating GAWBS from short samples of prototypes which reduces the cost of new fiber and cable development.

For optical communication systems, what matters is the total power generated by GAWBS in the GAWBS windows. To find out how much system degradation is caused by GAWBS, it is necessary to integrate all the noise power within the GAWBS window in both polarizations.

Therefore it is important to measure both polarization components, however, in practice it is not necessary to be able to separate them. Neither is it important to be able to separate in polarization components that are parallel, and orthogonal to the carrier. However, there is one benefit to being able to separate GAWBS noise that is parallel to the carrier and orthogonal to the carrier.

As previously noted, GAWBS noise is created by acoustic modes in the fiber. There are two sets of acoustic modes that dominate the generation of GAWBS. One set known as R0m modes only creates GAWBS noise that is parallel in polarization to the carrier, and this contribution is known as the polarized contribution. The other set known as Tr2m generates GAWBS noise that is both parallel and orthogonal to the carrier, and this contribution is known as the unpolarized contribution.

However, the Tr2m contributes twice as much to the orthogonal polarization as the polarized contribution. Therefore, we can use this relation as a "sanity" check on our measurements if we can separate the GAWBS noise into two contributions that are parallel and orthogonal to the carrier, which our invention can do in a single process.

While we have presented this disclosure using some specific examples, those skilled in the art will recognize that our teachings are not so limited. Accordingly, this disclosure should be only limited by the scope of the claims attached hereto.

The invention claimed is:

1. An arrangement providing for the accurate measurement for guided acoustic-wave Brillouin scattering (GAWBS), said arrangement comprising:
   a coherent optical receiver having a local oscillator input port and a signal port;
   a length of polarization maintaining (PM) optical fiber in optical communication with the coherent receiver LO port;
   a length of an optical fiber under test (FUT) in optical communication with the coherent receiver signal port;
   a continuous-wave (CW) laser in optical communication with the PM optical fiber and the FUT; and
   a calibrating laser (Laser-cal) in optical communication with the FUT;
   said arrangement configured such that light is output from the Laser-cal and light is output from the CW laser;
     the light output from the CW laser is split into two beams, one beam directed into the PM optical fiber and the other beam directed into the FUT;
     the light output from the Laser-cal is combined with the CW laser beam directed into the FUT;
     the coherent receiver receives light from the CW laser at its LO port and the combined Laser-cal output light and CW light at its signal port;
     the light received at the LO port and combined light received at the signal port is detected by a plurality of photodetectors and photodetector output signals resulting therefrom are subsequently filtered by respective bandpass filters;
     the filtered output signals are digitized through the effect of an analog to digital converter (ADC); and
   GAWBS measurements are determined from digitized output signals of the ADC; wherein the coherent receiver includes a hybrid which receives the LO port light and the signal port light;
   wherein the hybrid is configured to receive the LO port light and the signal port light and generate four separate outputs each of which overlaps the signal and the LO in two orthogonal polarizations (X, Y) and for each polarization overlaps them in two quadratures, in-phase and 90-degrees out-of-phase (I, Q).

2. The arrangement of claim 1 wherein the bandpass filters are configured to shift dynamic range of GAWBS measurement to a range where there exists GAWBS noise.

3. The arrangement of claim 2 wherein the GAWBS noise extends to about 1 GHz away from the central frequency of output light from the CW laser.

4. The arrangement of claim 3 further comprising one or more erbium-doped fiber amplifiers (EDFAs) positioned in an optical path of the FUT between the lasers and the coherent receiver.

5. The arrangement of claim 4 further comprising one or more bandpass filters positioned in the optical path of the FUT between the EDFAs and the coherent receiver.

6. The arrangement of claim 5 wherein the one or more bandpass filters positioned between the EDFAs and the coherent receiver are configured to filter out amplified spontaneous emission (ASE) noise.

7. The arrangement of claim 6 further configured to simultaneously measure both polarization components of GAWBS.

8. The arrangement of claim 7 wherein the bandpass filters include an optical amplifier that amplifies Rayleigh backscatter.

\* \* \* \* \*